United States Patent [19]

Chiba et al.

[11] Patent Number: 5,327,355
[45] Date of Patent: Jul. 5, 1994

[54] VOLTAGE OR REACTIVE POWER CONTROL METHOD AND CONTROL DEVICE THEREFOR

[75] Inventors: Tomio Chiba, Katsuta; Mitsuyasu Kido, Hitachi; Junzo Kawakami, Mito; Kunio Hirasawa, Hitachi; Yoshiaki Matsui, Katsuta, all of Japan

[73] Assignee: Hitachi, Ltd., Tokyo, Japan

[21] Appl. No.: 822,327

[22] Filed: Jan. 17, 1992

[30] Foreign Application Priority Data

Jan. 17, 1991 [JP] Japan ................................. 3-003667

[51] Int. Cl.$^5$ ............................................. G05F 1/20
[52] U.S. Cl. ................................. 364/483; 364/492; 364/495; 395/900; 395/907; 395/915
[58] Field of Search ................ 364/483, 492, 495; 395/900, 907, 915

[56] References Cited

U.S. PATENT DOCUMENTS

| | | | |
|---|---|---|---|
| 4,623,834 | 11/1986 | Klingbiel et al. | 323/258 |
| 4,748,341 | 5/1988 | Gupta | 307/64 |
| 5,019,979 | 5/1991 | Takahashi | 364/424.1 |
| 5,119,012 | 6/1992 | Okamura | 323/258 |
| 5,136,233 | 8/1992 | Klinkenberg et al. | 323/343 |

OTHER PUBLICATIONS

Satoshi Matsuda et al. IEEE Trans. on Indust. Electronics and Control Instrumentation "Power System Voltage Control by Distributed Expert Systems" vol. 37, No. 3 pp. 236-240 Jun. 1990.
D. Chui et al., Power System Control Convention 24, "Power System Control Using Fuzzy Reasons" Aug. 1990.

Primary Examiner—Thomas G. Black
Assistant Examiner—Julie D. Day
Attorney, Agent, or Firm—Antonelli, Terry, Stout & Kraus

[57] ABSTRACT

In order to control a voltage using e.g. a tap transformer, the difference $\Delta V$ between the actual voltage and a reference voltage is obtained and integrated over time. That integral is then modified by at least one parameter generated by fuzzy logic from control conditions of the voltage. In this way the fuzzy logic may find the optimum control strategy which keeps the actual voltage closest to the reference voltage without an excessive number of tap position changes. The reference voltage may vary with time, and therefore the control of the voltage with time may be evaluated, and the control conditions varied accordingly, e.g. by fuzzy logic, so that the control arrangement can exhibit learning. Normally, the integral is modified such that $$\int \Delta V dt \geq B$$

when B is the parameter determined by the fuzzy logic, but other control strategies may be used. The present invention is also applicable to control of reactive power.

42 Claims, 16 Drawing Sheets

| 30 min. Average Voltage | Frequency of Tap Change per Day | Decision | Control or Display |
|---|---|---|---|
| < Reference Voltage ± 2% | < 50 | Control Result-Good | No Control, No Display |
|  | ≥ 50 | Sensitivity-Too High | Control to Low Sensitivity |
| ≥ Reference Voltage ± 2% | < 50 | Sensitivity-Too Low | Control to High Sensitivity |
|  | ≥ 50 | Uncontrollable | Display "Adjust Limit" Control with Set Value of Previous Day. |

*Fig.6.*

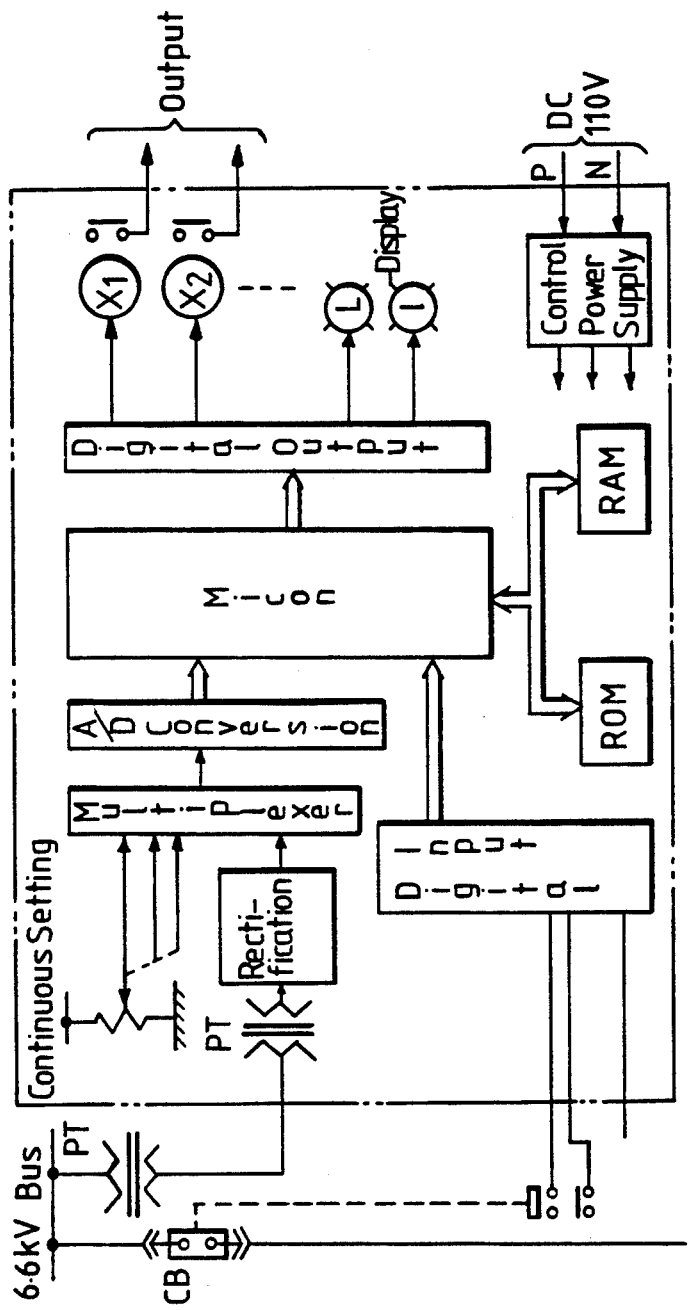
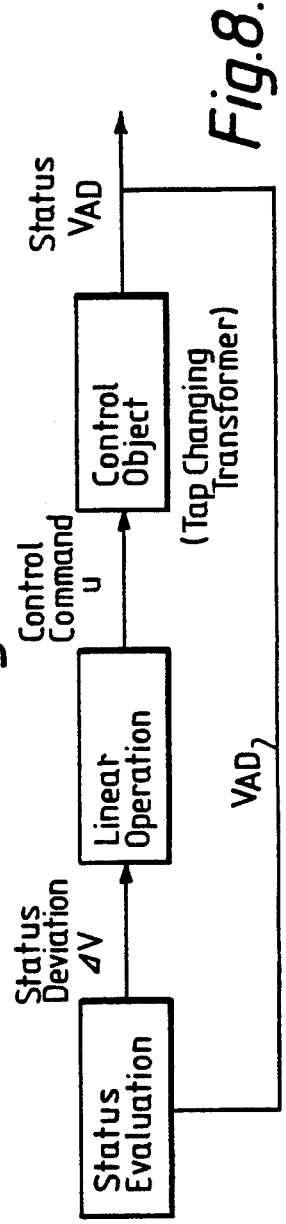
Fig.7.
Fig.8.

RULES FOR IMPROVING VOLTAGE CHARACTERISTIC (Rule 1)   IF the 30 min. average voltage is large on the positive side, and
          IF the deviation integration value is large on the positive side,
          THEN the corrected value of the control coefficient is decreased.
          (High Sensitivity Control.)

(Rule 2)   IF it is the time to raise the target voltage,
          IF the deviation integration value is large on the negative side,
          and
          IF the voltage fluctuating direction is large on the negative side,
          THEN the corrected value of the control coefficient is decreased.
          (High Sensitivity Control)

Fig.10.

RULES FOR REDUCING FREQUENCY OF TAP CHANGE (Rule 1) IF the 30 min. average voltage is substantially zero, and
IF the deviation integration value is large on the positive side,
THEN the corrected value of the control coefficient is increased.
(Low sensitivity control)

(Rule 2) IF it is the time to raise the target voltage,
IF the deviation integration value is large on the positive side, and
IF the voltage fluctuating direction is large on the positive side,
THEN the corrected value of the control coefficient is increased.
(Low sensitivity Control)

Fig.11.

VOLTAGE OR REACTIVE POWER CONTROL METHOD AND CONTROL DEVICE THEREFOR

BACKGROUND OF THE INVENTION

Field of the Invention

The present invention relates to a method and device for controlling voltage or reactive power in an electrical system.

Summary of the Prior Art

One way of controlling the voltage in an electric system, which is particularly suitable for high voltages, makes use of a tap transformer. The output voltage from the tap transformer is determined by the location of a movable "tap", and the position of that tap on the output coils of the transformer is determined by a suitable controller. Since high voltages are involved, there is some deterioration of the tap each time it is moved, and therefore it is normally desirable to move the tap as infrequently as possible. On the other hand, it is necessary to move that tap in order to vary the output voltage from the transformer.

It is already known to control an on-load voltage adjuster and an on-load tap changing transformer automatically on the basis of a "raise" or "drop" command to maintain the system-voltage at a predetermined level. An example of such a method is disclosed in HITACHI REVIEW (pp. 54 to 56, VOL, 71 No. 3). The operations in this case are as follows.

The current value of the system-voltage is detected every 100 ms, for example, and the deviation represented by Formula 3 below between the value of Formula 1 and a reference voltage (target voltage) defined by Formula 2 is determined according to Formula 4, and the value $V_3$ is integrated for T.

Formula 1
$$V_{AD} = V_1 \quad (1)$$

Formula 2
$$V_S = V_2 \quad (2)$$

Formula 3
$$\Delta V = V_3 \quad (3)$$

Formula 4
$$\Delta V(\%) = \frac{V_{AD} - V_S}{V_S} \times 100 \quad (4)$$

Formula 5
$$\int_{th}^{th + T} \Delta V dt = V_4 \quad (5)$$

This integration result and the integration constant (the integration time set value $\times 10\%$) are compared to determine whether a raise or drop command for moving the tap of the tap transformer is necessary or not.

If the control of the voltage was ideal, the average voltage for a constant time period (30 min.) would always be within a control range ($\pm 2\%$) of the reference voltage $V_2$ and that the tap changing frequency would always be within a predetermined value (50 times per day). The former represents a system-voltage control target, and the latter is determined by the lifetime of the tap changing mechanism.

If the setting of the insensitive zone (the minimum deviation $V_3$ for which the apparatus can operate) of the apparatus and the integration time are not correct, the control targets cannot be achieved, or the frequency of tap switching is excessively high. For controlling the sensitivity, therefore, the known apparatus may change the insensitivity zone and the integration time automatically once a day according to the behaviors of the previous dayton the basis of the 30 min. average voltage and the tap changing frequency per day, for example.

It is also known to make use of fuzzy logic in control systems. Fuzzy logic seeks to achieve computer control based on qualitative, rather than quantitative, functions so that it more closely approaches the approach taken by a human being to a particular control problem. The fuzzy logic system may be set up to operate according to control patterns established in advance, or according to patterns developed by the fuzzy logic system during the operation thereof.

Thus, for example, JP-A-3-0085491 discloses control of a reactor in which conditions within the reactor are applied as inputs to the fuzzy logic controller, which then controls the positions of the speed of movement of the control rods, in order to control the reactor outlet temperature as closely as possible to a control target temperature.

Also, an article entitled "Power System Control Using Fuzzy Reasoning" by D. Chui et. al., presented at the P. S. C. Convention from Aug. 19 to 24, 1990, proposed applying fuzzy logic to voltage control.

SUMMARY OF THE PRESENT INVENTION

As was mentioned above, there are two control targets when controlling a tap transformer, namely control of the system voltage, approach the target (reference) voltage and to control the tap changing mechanism to ensure a long lifetime thereof. In the known system, an automatic setting changing function is provided to determine the setting value (the insensitive zone or the integration period) automatically in the apparatus. This changing function is changed approximately once a day, at most. If the voltage quality is to be improved, the tap changing frequency per day is increased, drastically reducing the lifetime of the tap changing transformer. If, on the other hand the frequency of tap changes is to be reduced, the voltage quality is deteriorated (the absolute value of $V_3$ increases and the deviation between the 30 min. average voltage and the reference voltage increases, or the system-voltage fluctuates greatly).

In the discussions in the article by D. Chui et. al. referred to above, it was mentioned that a tap transformer could be used to control voltage, but the problem of the conflict between accuracy of control of the reference voltage and the lifetime of the tap changing mechanism was not considered. Therefore, the present invention considers these two apparently contradictary control targets, and proposes that fuzzy logic be used to provide optimum control.

It should be noted that both the known systems have concentrated on voltage control, but it is also possible for control to be on the basis of reactive power, since there is a relationship between voltage and reactive power.

Therefore, according to the present invention, control of the voltage or reactive power is achieved by fuzzy logic on the basis of monitoring the difference between the actual voltage and a reference voltage, and then controlling the system by a control strategy which considers both the difference and the desired maximum frequency of tap changes.

According to a first aspect of the present invention, the control is on the basis of the following formula:

$$\int^A C\Delta V dt \geq B$$

where:

t is time
$\Delta V$ is the voltage difference and
A, B and C are parameters varied by the fuzzy logic.

According to a second aspect, a control signal having a predetermined relationship to the voltage difference, e.g. that of the known system referred to in "Hitachi Review" is multiplied by a coefficient which is determined by the fuzzy logic.

Thus, the present invention may determine whether a raise or drop command should be provided to a voltage adjustor, (e.g. a tap transformer) by integration using the above function, with the parameters of that function being under the control of the fuzzy logic.

Fuzzy logic can therefore analyze the contradictory requirements of reducing the frequency of tap changes and improving the accuracy of voltage control, and can vary the control achieved by the present invention in dependence on a wide range of considerations. For example, the reference voltage (control voltage) may vary with time, and then the fuzzy logic may provide control suitable to ensure that the actual voltage changes as quickly as possible at the time of changes in the reference voltage, without an excessive number of tap changes. Thus, at the time of change in reference voltage, the fuzzy logic may cause the voltage to depart from the reference voltage before the change by more than the normally permitted variation if such a variation is in the direction towards which the voltage will have to change when the change in reference voltage occurs.

The present invention also permits the control of the voltage to take into account more factors than can be taken into account in the known system. For example, the system in "Hitachi Review" referred to above merely monitors the variation in voltage over a predetermined period. With the present invention, the fuzzy logic may take into account the absolute time (i.e. the time of day, week, month, season), and/or the trend in the variation in actual voltage relative to the reference voltage over a longer time period than period of integration. Thus, if the voltage has an overall trend of variation, then this may be controlled independent of more rapid voltage fluctuations. It is also possible to take into account the integral of the voltage difference over different time periods to detect rapid changes, slower changes, etc.

The present invention relates to both method and device aspects of the present invention. As was mentioned above, the present invention is primarily envisaged in terms of voltage control, but may readily be adapted to reactive power control. Furthermore, although the present invention has been derived with particular emphasis on control of a tap transformer, it is not limited to such control and may be used for control in other electrical systems.

In the above discussion of the present invention, it has been assumed that the rules by which the fuzzy logic operates are fixed. However, it is also possible for the result of the voltage or reactive power control achieved by the present invention to be monitored, and for the effectiveness of that control to be evaluated. Then, if necessary, the control conditions may be revised in order to modify the control strategy. Such revision may be achieved by fuzzy logic techniques so that the system embodying the present invention may exhibit a learning function so that its performance may change from that originally set by the designer thereof.

BRIEF DESCRIPTION OF THE DRAWINGS

Embodiments of the present invention will now be described in detail, by way of example, with reference to the accompanying drawings, in which:

FIG. 6 is a diagram showing an example of changing the setting of a known apparatus;

FIG. 7 is a block diagram showing the hardware of the apparatus of the first embodiments;

FIG. 8 is a block diagram showing the functions of the known apparatus;

FIG. 10 is a diagram showing the rules for improving the voltage characteristics;

FIG. 11 is a diagram showing the rules for reducing the frequency of tap change;

DETAILED DESCRIPTION

A first embodiment of the present invention will now be described with reference to FIG. 1 to 18.

Figure 1:
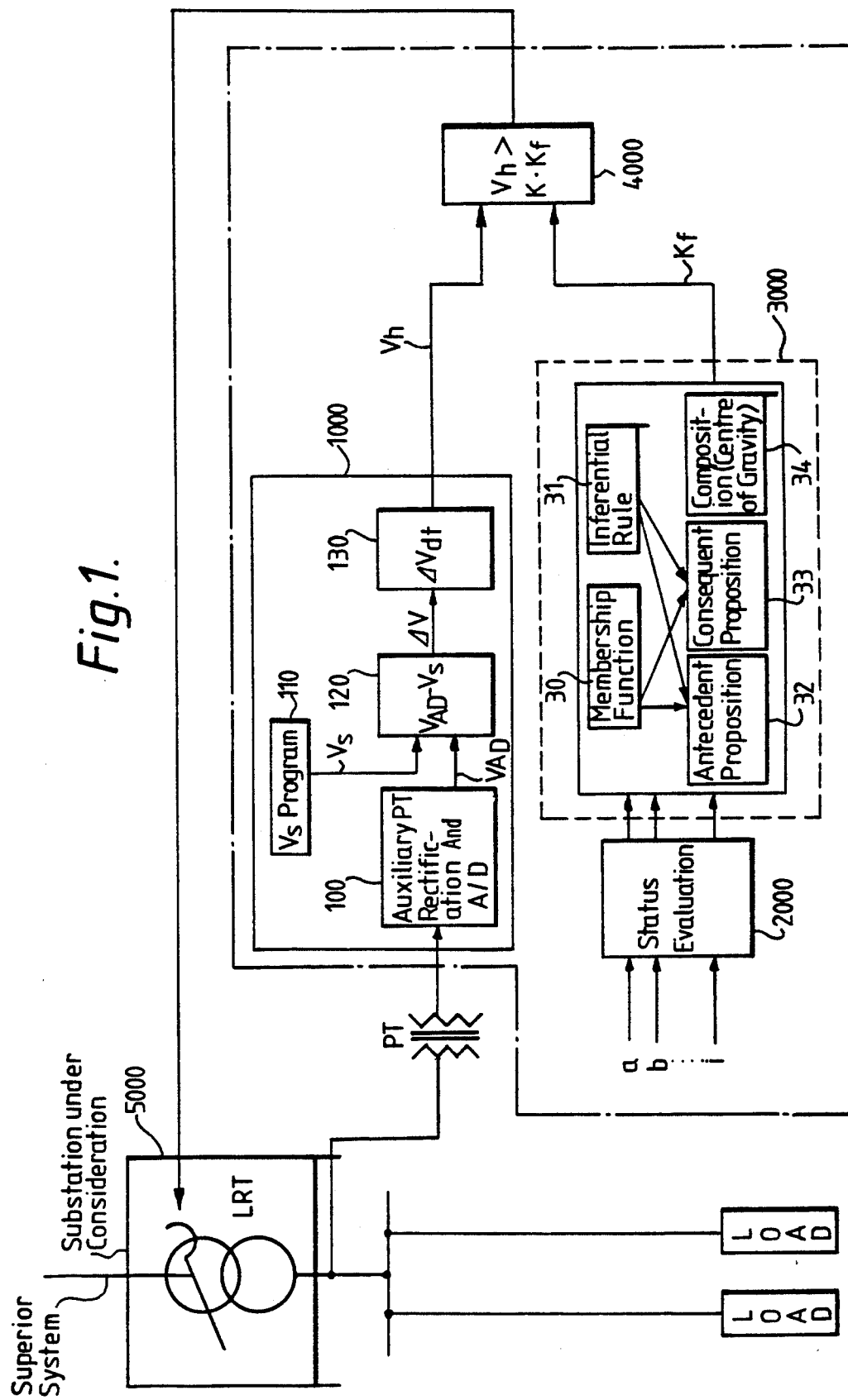
FIG. 1 is a block diagram showing the apparatus using the fuzzy inference of a first embodiment of the present invention.

FIG. 1 shows a first embodiment of a system-voltage control apparatus of the present invention. The description of this apparatus will be primarily in terms of functions, with suitable hardware and software components being used to achieve those functions. The present apparatus is constructed so as to have:

(1) a deviation integrating function 1000 for integrating the deviation $V_3$ between system-voltage $V_1$ which is input to the apparatus and a reference voltage $V_2$ for a constant time period, this function being known in the prior art;

(3) a system-voltage status evaluating function 2000 for identifying features capable of improving the voltage characteristics and reducing the frequency of tap change of a tap changing transformer;

(2) an integration constant corrected value inferring function 3000 for inferring an integration constant corrected value (to be described in more detail later) by input of the result derived by the system-voltage status evaluating function 2000 using fuzzy inference on the basis of an integration constant correcting rule, which rule expresses the relationship between the status evaluation result and the integration constant corrected value;

(4) a judging function 4000 for judging whether or not switching of the tap is necessary; this is on the basis of consideration of the corrected value obtained by the inferring function 3000; and (5) an on-load tap changing transformer (LRT) 5000 to be controlled.

First of all, a known digital type voltage adjusting relay will be briefly described before describing the deviation integrating function 1000.

In a known digital type voltage adjusting relay (relay) the on-load voltage adjuster or the on-loaded tap changing transformer (LRT) is automatically adjusted in response to a raise or drop command so that the system-voltage may be held at a predetermined reference voltage ($V_2$). This operation is accomplished as follows.

First, the effective value of the system-voltage is determined every 100 ms, for example. Then the difference $V_3$ between the effective value $V_1$ and the reference voltage $V_2$ is determined by Formula 4 and is integrated, indicated by formula 5, to obtain value $V_4$.

Figure 2:
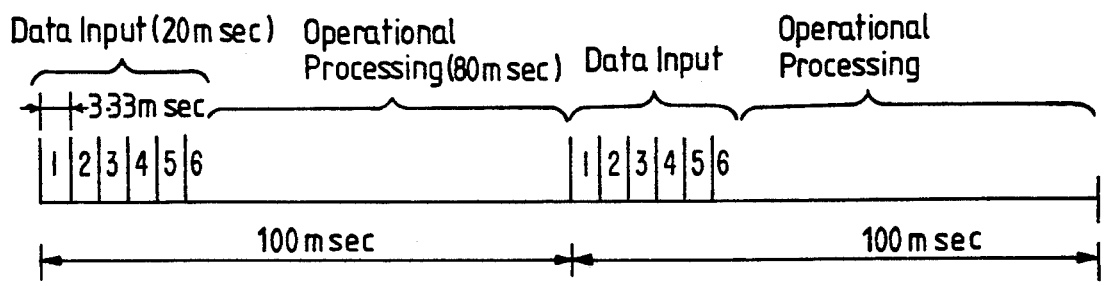
FIG. 2 is a schematic diagram illustrating data input in the apparatus of FIG. 1.

FIG. 2 shows an example of data processing. In this example, data corresponding to input voltages are inputted six times in first time zones, each zone being of 100 ms, so that the data are input at intervals of 3.33 ms. The average value of four of the input voltages of the six data is obtained, the four being obtained by excluding the maximum and the minimum of the six data, and this average value is called the "average voltage $V_1$ of the effective values".

Figure 3:
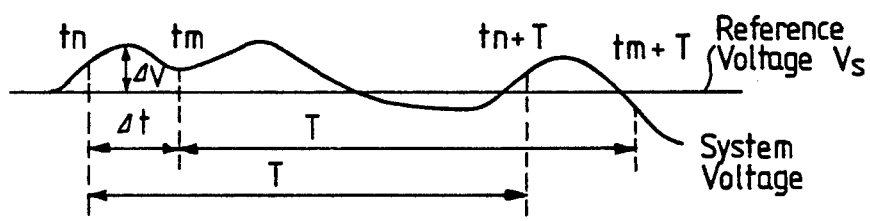
FIG. 3 is a schematic diagram showing deviation integration.

FIG. 3 then illustrates the integration operation.

Figure 4:
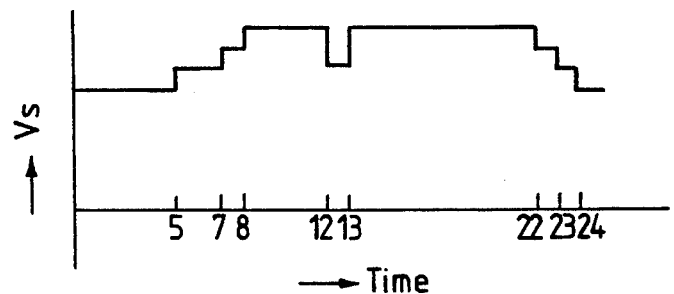
FIG. 4 is a diagram showing an example for setting the reference voltage (target voltage)

FIG. 4 shows the reference voltage $V_2$ which is set for each time zone, e.g. by dividing one day into twelve time zones.

Figure 5:
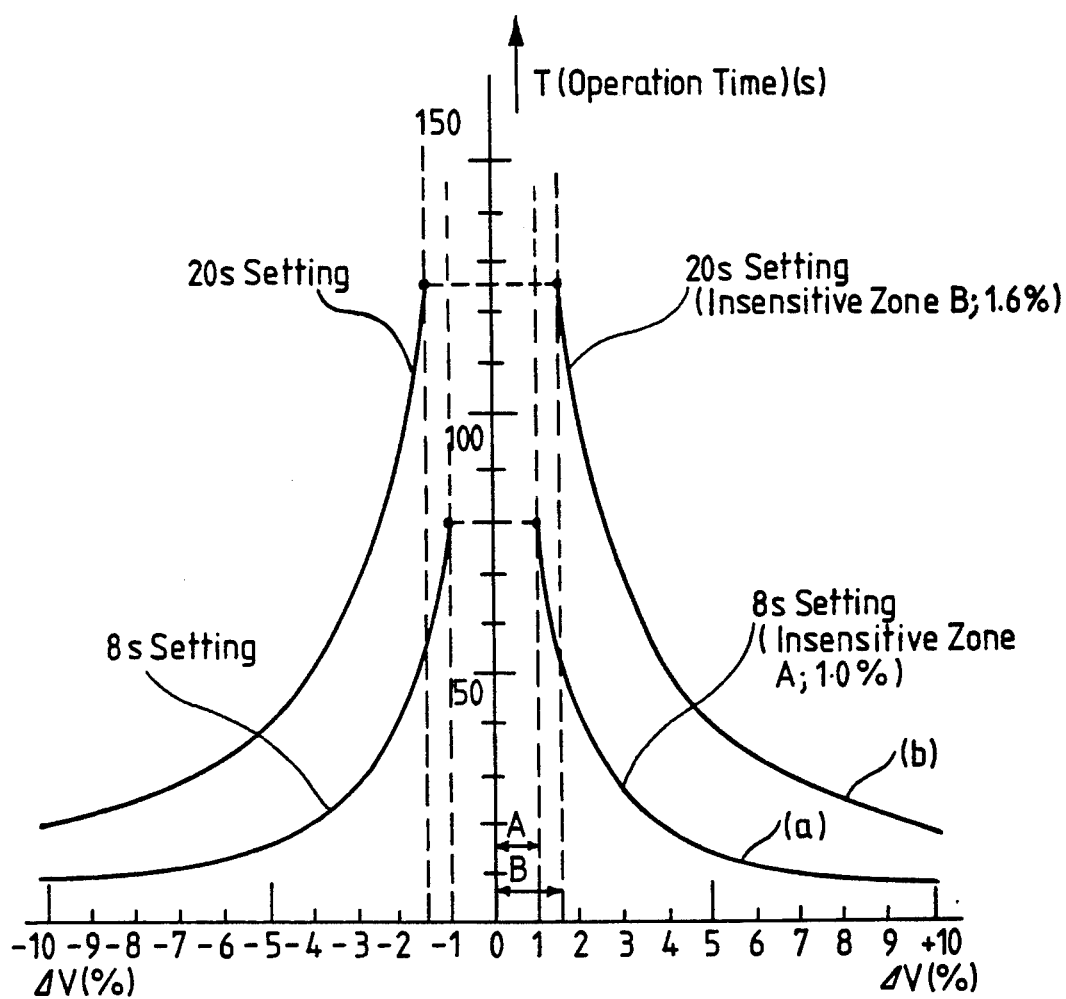
FIG. 5 is a diagram showing an example of the operation characteristics of the apparatus of FIG. 1.

The integration result ($V_4$) and the integration constant (=the integration time set value × 10%) are compared to determine whether the raise or drop command is needed. Hence, the operation time characteristics are as shown in FIG. 5. In FIG. 5, curve (a) plots an example corresponding to an operation time setting of 8.0 s and an insensitive zone of 1.0%, and curve (b) plots an example corresponding to the operation time characteristics for an operation time setting of 20.0 s and an insensitive zone of 1.6%. The operation time T (s) is expressed by the following Formula:

Formula 6

$$\text{Operation Time } T(S) = \frac{\text{Integration Time Set Value } (S) \times 10(\%)}{\text{Deviation } \Delta V(\%)} . \quad (6)$$

The insensitive zone set value indicates the minimum value of the deviation $V_3$ at which this apparatus can operate.

As is apparent from the operation time characteristic diagram of FIG. 5, therefore, such an apparatus responds relatively quickly when the line voltage (the input voltage $V_1$) has a large fluctuation relative to the reference voltage $V_2$ (corresponding to the case where the deviation $V_3$ is high), and relatively slowly when the line voltage has a small fluctuation relative to the reference voltage $V_2$ (corresponding to the case where the deviation $V_3$ is high). These integration characteristics are the most significant for controlling the system voltage, i.e., the on-load tap changing transformer LRT.

If the setting of the insensitive zone and the setting of the integration time in such an apparatus are not correct, the average voltage for a constant time period (30 min..) may exceed the control range (±2%) of the reference voltage, or the switching frequency may become excessively high. In a known digital type voltage adjusting relay, therefore, the control of the insensitive zone and the integration time, i.e., sensitivity control, is carried out once a day by adding an automatic setting changing function, as shown in FIG. 6. FIG. 6 shows examples of sensitivity controls for individual cases.

FIG. 7 shows an example of the hardware block structure of the apparatus of this first embodiment In FIG. 7: the block "A-D conversion" corresponds to an analog/digital converter; the block "ROM" corresponds to a program memory; the block "RAM" corresponds to a data memory; and the block "Micon" corresponds to a microcomputer. Moreover, the block "PT" corresponds to a voltage transformer (see also FIG. 1).

In the apparatus, data are inputted through the voltage transformer PT shown in FIG. 7 and are converted into an effective (analog) value by the rectifier. Then, this analog value is converted into a digital value by the A/D converter, and this digital value is input to the microcomputer (the "micon"). Then, the microcomputer receives the data shown in FIG. 2 and executes the integration operations shown in FIG. 3, i.e., the deviation integration ($V_4$) and the comparison between said deviation integrated value and the integration constant (the integration time setting value × 10%).

FIG. 8 is a block diagram showing the control system of the known apparatus described above. In FIG. 8, the status evaluating unit inputs the output $V_1$ (as an analog value) of the control object (e.g., the tap changing transformer in the present embodiment) and converts it into a digital value to determine the difference $V_3(=V_1-V_2)$ from the reference voltage $V_2$ shown in FIG. 4.

The linear operation unit executes the following (linear) processing.

$V_4 \geq$ Integration Constant
(Integration Time Setting Value $\times$ 10%).

On the basis of the aforementioned processing result, a control command u (e.g., a tap changing raise or drop command to the tap changing transformer) is issued to the control object.

In the arrangement illustrated, the control object is a tap changing transformer LRT. This transformer contains a motor-driven operation mechanism for tap changing.

Reverting to FIG. 1, the deviation integrating function 1000 will now be described. This function is absolutely identical to that of the apparatus described above. Thus, FIG. 1 shows an input unit 100 composed of an auxiliary voltage transformer (for transforming e.g. 100V→10V), the rectifying unit for rectifying an AC quantity into an effctive analog value, and an A/D converter for converting the analog value into a digital value. Also shown is a function 110 ( a memory) for programming the reference voltage value $V_2$ shown in FIG. 4, a function 120 for detecting the deviation $V_3(=V_1-V_2)$, and a function 130 for deviation integration ($V_4$).

Next, the system-voltage status evaluating function 2000 will be described in detail, as will the integration constant corrected value inferring function 3000, and the tap changing propriety judging function 4000, taking into consideration the corrected value.

First, the system voltage status evaluating function 2000 will be described. The apparatus of the prior art makes use only of the voltage status deviation $V_3(=V_1-V_2)$, as shown in FIG. 8, but the present invention also evaluates the statuses of the following items (contents), for example:

(a) Deviation Integrated Value

Formula 7
$$V_h = V_5 \quad (V_4). \tag{7}$$

(Only this item is identical to that of the known arrangement.)

(b) Fluctuation Direction of Deviation Integrated Value

Formula 8
$$\Delta V_h/dt = V_6. \tag{8}$$

(c) Voltage Fluctuation Direction at the Present Time Formula 9

Formula 9
$$\Delta V/dt = V_7. \tag{9}$$

(d) Period of Time till Switching Time of Reference Voltage $V_2$ and Raise or Drop direction of the Reference Voltage (Whether $V_s$ Is to Be Raised or Dropped)

(e) Error and Fluctuation Direction of 30 min. Average Voltage $V_{30}$ from Reference Voltage Formula 10
$$\Delta V_{30}/dt = V_S. \tag{10}$$

(f) Tap Changing Frequency (i.e., Tap Changing Frequency till Present Time for Today and for the previous day)

(g) Maximum of Error of 30 min. Average Voltage $V_{30}$ for the previous day (h) Error (from Reference Voltage) of Average Voltage $V_{10}$ or $V_{50}$ of 1 or 5 min, and Fluctuation direction Formula 11
$$\Delta V_{10}/dt = V_9. \tag{11}$$

Formula 12
$$\Delta V_{50}/dt = V_{10}. \tag{12}$$

(i) Reference Voltage Value (at Each Time)

Next, the integration constant corrected value inferring function 3000 will be described. This function determines an integration constant corrected value $K_f$ by the use of fuzzy inference. The sub-functions of this inferring function 3000 will be discussed later. The value $K_f$ is determined, and the following Formula is executed by the judging function 4000 for judging the correctness (for sensitivity control) of the tap changes (to be described later).

Formula 13
$$\int_{tn}^{tn+T} \Delta V dt \geq K \cdot K_f, \tag{13}$$

where:
K: Integration Constant,
$K_f$: Integration Constant (corrected value).

① There are thus several possibilities depending on the values of K when $K_f > 1.0$, the apparatus is made less likely to operate than the known prior art apparatus. Thus, in this case, the frequency of tap changes is reduced by dropping the sensitivity.

② When $K_f = 1.0$, the apparatus operates in the same way as the known apparatus.

③ When $K_f < 1.0$, the apparatus is more likely (for quick operations) to operate than the known apparatus. Thus, in this case, the voltage characteristic is improved, and the tap switching frequency is reduced by raising the sensitivity.

Next, an example showing the determination of the integration constant corrected value $K_f$ by fuzzy inference will be described. First, fuzzy theory will be described. Fuzzy theory (ambiguous theory) has the feature that it can describe a fuzzy control method, which is based upon the "perceptions and experiences" of experts, in the form of control rules ("IF ∼, THEN ∼.") (antecedent and subsequent propositions), and in that it can incorporate judgments (whether high or low) for situations in which ordinary measurements are difficult, for control operations.

The known computer control (the known voltage adjusting relay) designs the controller and identifies the parameter by selecting and quantitizing the data from a control object (the output voltage of the tap changing transformer) and by preparing a model of the system in dependence on the control object. The amount of operation is determined by the control operation on the basis of a small number of quantitized inputs by that controller.

On the other hand, fuzzy control designs control rules by positively evaluating the fuzziness accompanying the control object and by qualitatively determining the features of the system. By using a plurality of control rules, a number of input data are utilized to determine the operation characteristic (the integration constant corrected value $K_f$ in the present embodiment).

By knowing which control rule is used for the control operation and how much the control rule is used to determine the operation characteristic, changes in the control rule, i.e., improvement in the control level by studys can be easily accomplished.

On the other hand, fuzzy theory permits use of "fuzziness", which occurs due to human subjectivity, on the basis of fuzzy set theory. A fuzzy set has an ambiguous boundary and is a set of elements expressing the proportion of membership of the set in terms of a membership function. This membership function takes a value from 0 to 1, and the value is called the degree (Grade) of membership of the set. The expression can be made vague by causing the degree to correspond to an ambiguous extent (when the value is "1", the degree corresponds to complete correspondence; when the value "0", the degree corresponds to no correspondence; and when the value is between "0" and "1", the degree has an according correspondence).

Thus, fuzzy theory involves quantitizing the fuzziness of words in terms of a membership function. As a result, human knowledge such as perceptions and experiences can be handled in familiar form to effect synthetic judgment leveled according to the situations of various types of knowledge and analytic judgment using data based on deviations from the knowledge.

Figure 9:
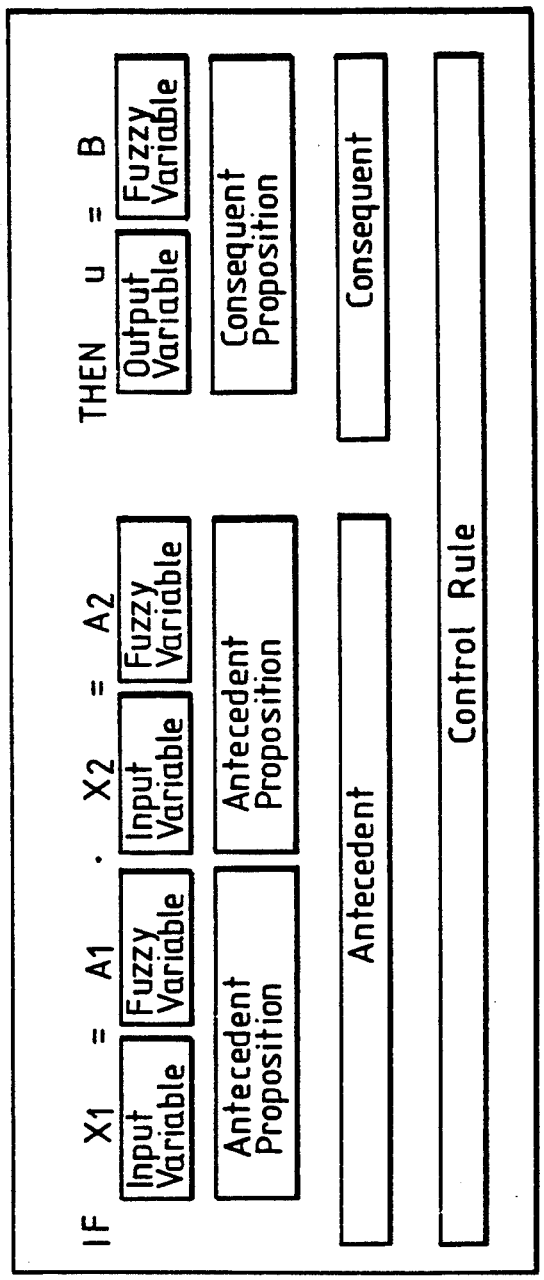
FIG. 9 is a diagram showing the structure of the control rules.

Fuzzy inference makes use of knowledge called membership functions and inferential rules. In the present embodiment, the membership function is for determining whether the frequency of tap changes is high or low, for example. The inferential rule is composed of an antecedent proposition and a consequent proposition, as shown in FIG. 9, and describes the knowledge of the expert in the object field (to reduce the frequency of tap changes and to improve the characteristic (i.e. the relationship between the actual voltage and reference voltage) of the voltage, in the present embodiment). However, the expert knowledge is not quantitative but contains ambiguousness, so that it can be sufficiently qualitative to be expressed easily by an expert.

FIG. 10 shows an example of the rule for improving the characteristic of the voltage. Moreover, FIG. 11 shows an example of reducing the frequency of tap changes. The following description then compares this with the structure of the control rule shown in FIG. 9.

The individual variables of "IF $X_1 = A_1$ and $X_2 = A_2$, THEN $Nu = B$" correspond to the following rule 1 of FIG. 10:

$X_1$ (Input Variable): 30 min. average voltage
$A_1$ (Fuzzy Variable): Large on the positive side
$X_2$ (Input Variable): Deviation integration Value
$A_2$ (Fuzzy Variable): Large on the positive side
u (Output Variable): Control coefficient (integration constant) corrected value
B (Fuzzy Variable): Small For the rule 2 of FIG. 10, moreover, the variables correspond as follows:

$X_1$ (Input Variable): Target voltage
$A_1$ Fuzzy Variable): time to raise (How close to the time)
$X_2$ (Input Variable): Deviation integration value
$A_2$ (Fuzzy Variable): Large on the negative side
$X_3$ (Input Variable): Voltage fluctuating direction
$A_3$ (Fuzzy Variable): Large on the negative side
u (Output Variable): Corrected value of control coefficient (integration constant)
B (Fuzzy Variable): Small The rules of FIG. 11, correspond in a similar way.

Figure 12:
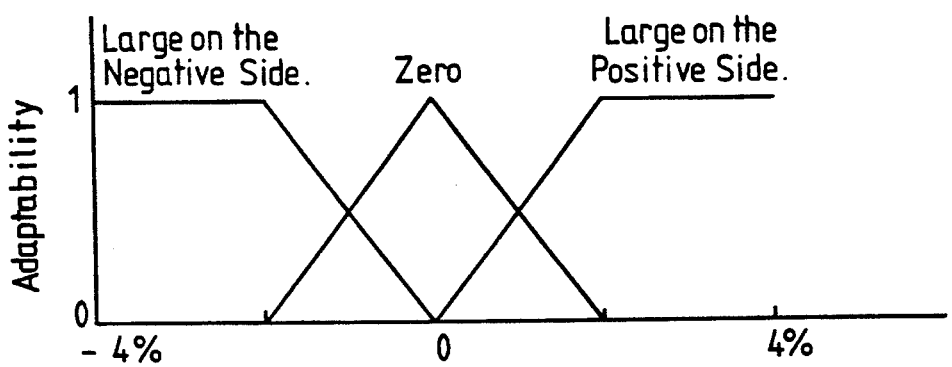
FIG. 12 is a diagram showing first possible membership functions of the input variable and the output variable.
Figure 13:
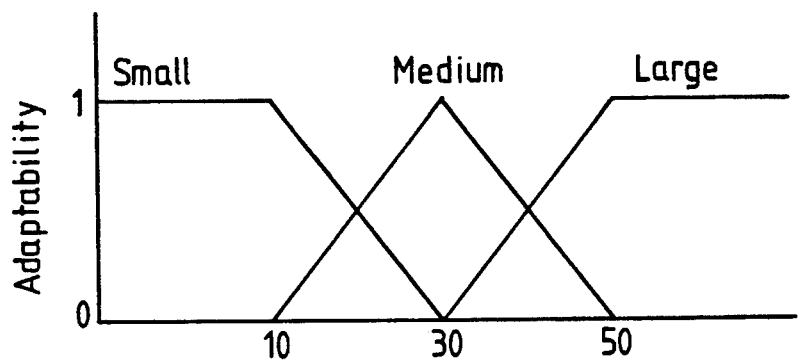
FIG. 13 is a diagram showing second possible membership functions of the input variable and the output variable.
Figure 14:
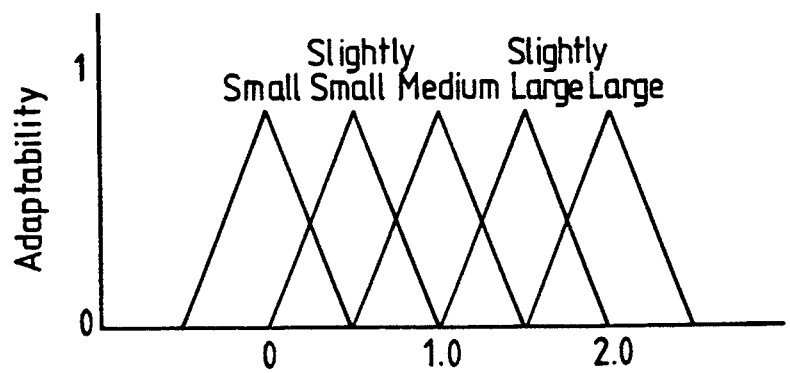
FIG. 14 is a diagram showing third possible membership functions of the input variable and the output variable.

FIG. 12 shows an example of the membership function for the error of the 30 min. average voltage; FIG. 13 shows an example of the membership function of the frequency of tap change; and FIG. 14 shows an example of the membership function of the integration constant corrected value.

Figure 15A:
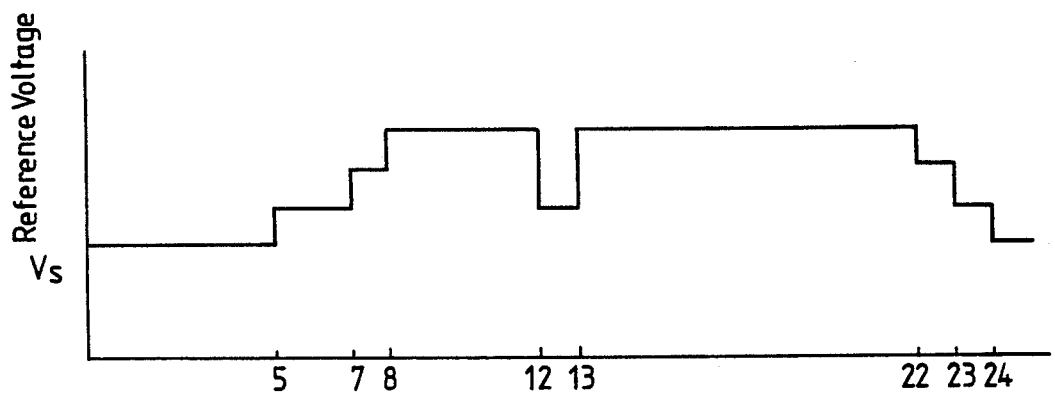
FIGS. 15A and 15B are diagrams showing the membership functions of the target voltage and the input variable (the period till the target voltage switching time).
Figure 15B:
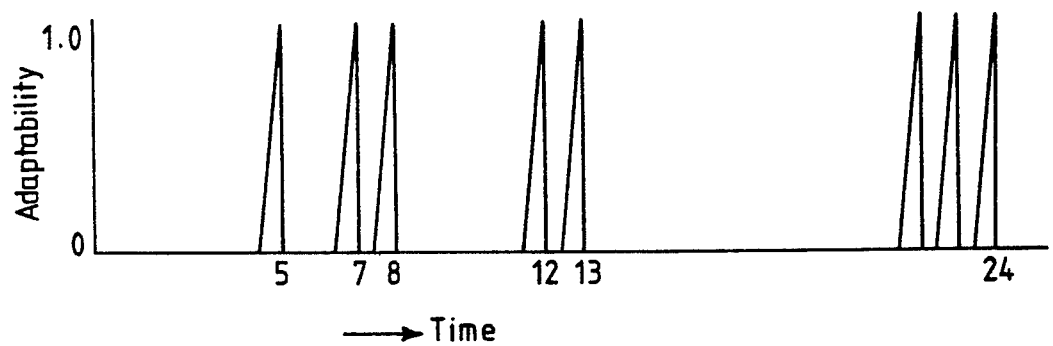

On the other hand, FIGS. 15A and 15B show an example of the membership function for the time period till the reference voltage changing time in a manner to correspond to the reference voltage $V_s$.

Figure 16:
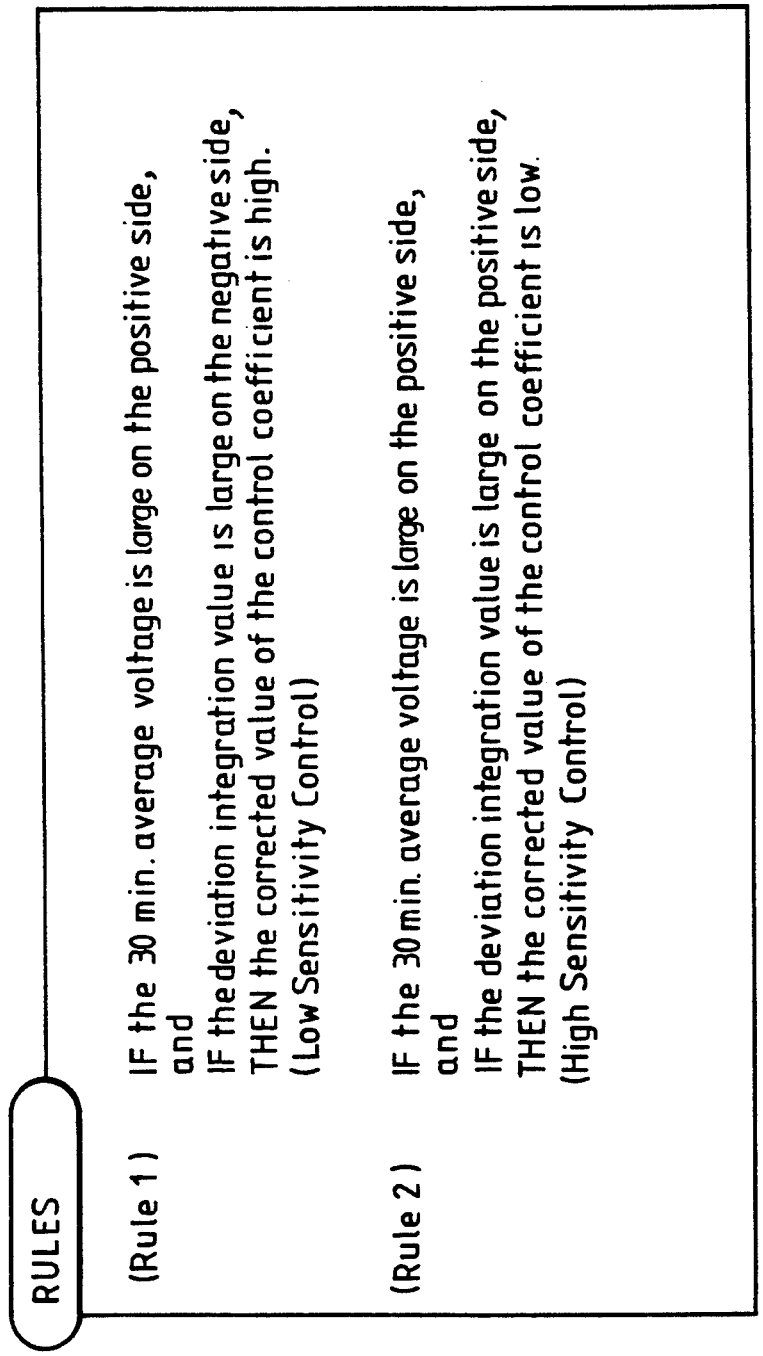
FIG. 16 is a diagram showing the control rules.

Next, an example for determining the integration constant corrected value Kf by the known method of "maximum combined gravity center calculation" will now be described by applying fuzzy inference. An example corresponding to execution of the two rules shown in FIG. 16 will be discussed to facilitate the description. The rules shown in FIG. 16 are made to correspond to the structure of the rule of FIG. 9, as follows.

Rule 1
$X_1$ (Input Variable): 30 min. average voltage
$A_1$ (Fuzzy Variable): Large on the positive side
$X_2$ (Input Variable): Deviation integration value
$A_2$ (Fuzzy Variable): Large on the negative side
u (Output Variable): Control coefficient (integration constant)
B (Fuzzy Variable): High Rule 2
$X_1$ (Input Variable): 30 min. average voltage
$A_1$ (Fuzzy Variable): Large on the positive side
$X_2$ (Input Variable): Deviation integration Value
$A_2$ (Fuzzy Variable): Large on the positive side
u (Output Variable): Control coefficient
B (Fuzzy Variable): Low Next, an example for determining the control coefficient $K_f$ (the integration constant corrected value) by fuzzy inference according to the aforementioned rules will be described with reference to FIG. 17.

Figure 17:
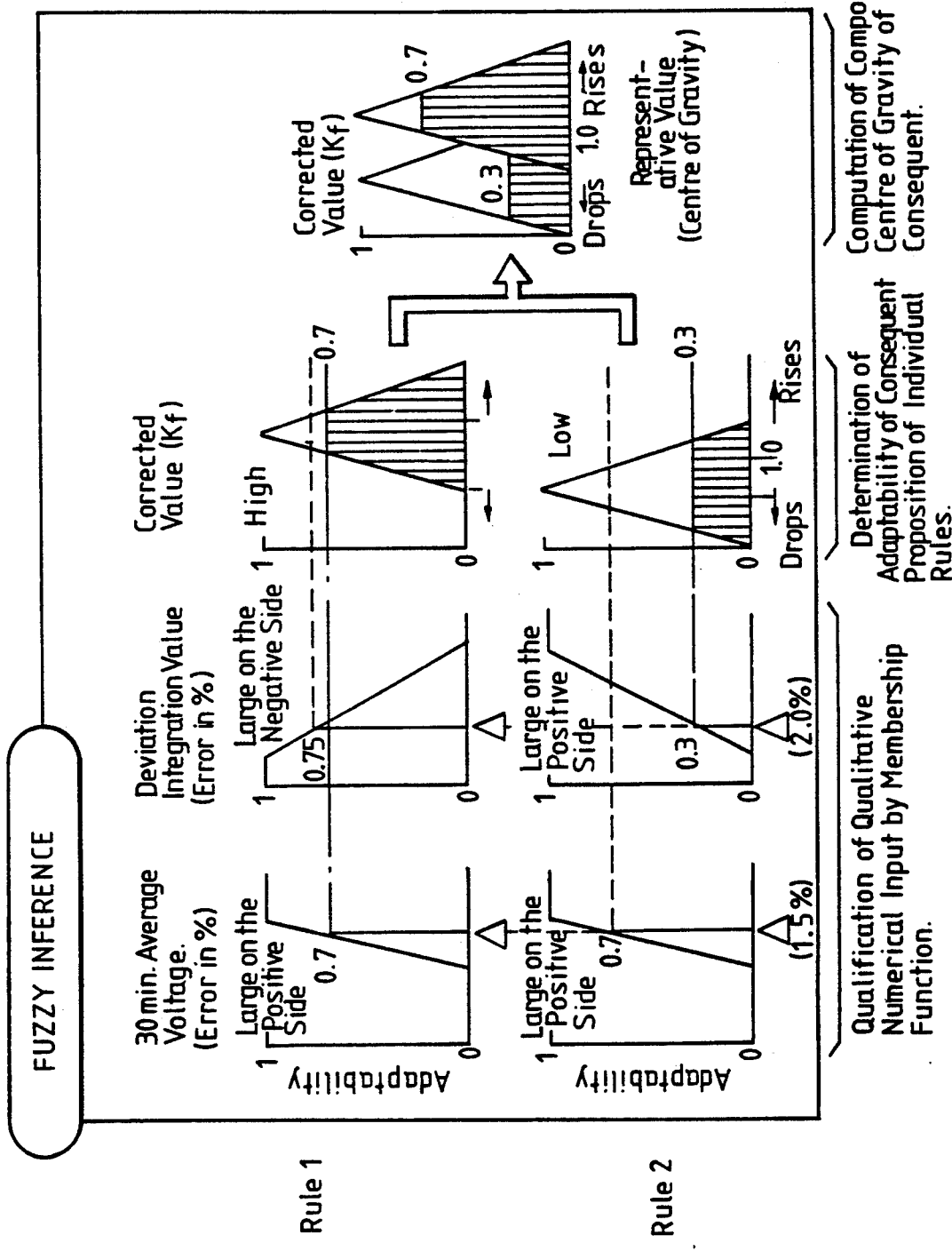
FIG. 17 is a diagram for explaining the fuzzy inference operations.

A 30 min. average voltage error of 1.5% and a deviation integration error of −2.0% are input to the fuzzy inferential portion (Δ portions in FIG. 17). The fuzzy inferential portion uses a membership function to determine the adaptability (confidence) of the individual items constituting the antecedent proposition of the inferential rule.

For example, the intersection of the 30 min. average voltage error of 1.5% with the item "large on the positive side" of Rule 1 is 0.7, and the intersection with the item "large on the positive side" of Rule 2 is also 0.7. These numerical values are known as the adaptability (confidence) of the items.

Likewise, the adaptability of the deviation integration value error of −2.0% with the item "large on the negative side" of Rule 1 is 0.75, and the adaptability with the item "large on the positive side" of Rule 2 is 0.3.

Next, the adaptability of the antecedent proposition is determined for each inferential rule to introduce the adaptability of the consequent proposition.

If Rule 1 of FIG. 17 is followed, for example, the adaptability of the item "large on the positive side" is 0.7, and the adaptability of the item "large on the negative side" is 0.75. According to the Max-Min method, the adaptability (confidence) of the consequent proposition that the corrected value of the control coefficient is high is the smaller value of 0.7. Likewise, the adaptability of the consequent proposition of the item "the corrected value is low" for the control coefficient of Rule 2 is determined to be 0.3.

As shown in FIG. 17, moreover, the adaptability of the consequent proposition determined for each rule is expressed in areas, whose center of gravity is determined to achieve the final conclusion. Thus, the composition of the consequent proposition and has a numerical output.

Hence, in the operation of fuzzy inference, the quantitative numerical inputs are converted into qualitative items by the membership function, and a quantitative conclusion is induced from the inferential rule combining the qualitative items.

In the embodiments of FIGS. 16 and 17, the current 30 min. average voltage error of 1.5% and the current deviation integration error of $-2\%$ have their centers of gravity determined to be more than 1.0, as is apparent from FIG. 17. As a result, the control coefficient (the integration constant) corrected value $K_f$ exceeds 1.0. In other words, the sensitivity is changed to make it less likely (with a delay) that a tap change command will be issued. When these values are input, the frequency of tap changes is reduced. Hence, if the 30 min. average voltage error is as high as 1.5% (2% at the maximum) on the positive side and if the differential integration (for about 2 to 3 min.) error is as high as $-2.0\%$ on the negative side in the direction opposite to the 30 min. average voltage, the absolute value of the current deviation integration error is high, if control is to be made mainly on the 30 min. average voltage. If the tap is not changed but left as it is, the 30 min. average voltage error is likely to drop because the deviation integration error has a minus value. These concepts will be understood to satisfy the thinking of an expert.

The integration constant corrected value inferring function 3000 of FIG. 1 executes The functions thus far described. Thus, there are the following sub-functions: the membership function described above; an inference rule 31; an antecedent proposition 32; consequent proposition 32; and composition 34 (for computing the center of gravity).

As has been described above, the contradictory targets of reducing the frequency of tap changes and improving the voltage characteristic can be solved by determining an integration constant corrected value $K_f$ and by executing the following processing in the tap changing propriety judging function 4000.

(Operations of Tap changing Propriety Judging Function 4000)

$$V_5 > K \cdot K_r \tag{14}$$

$$V_5 = V_4$$

Formula 14

$$\Delta V(\%) = \frac{V_{AD} - V_S}{V_S} \times 100.$$

wherein:

K = Integration Constant (Integration Time Set Value × 10%) and $K_f$ = Integration Constant Corrected Value (Determined by fuzzy inference).

In the above, description, there has been described an example of correcting the integration constant K by the corrected value $K_f$, but this correction can be accomplished by the similar methods which will now be described.

One method uses the following Formula to correct the deviation value $V_3$ by use of the corrected value $K_f$.

Formula 15

$$\int_{tn}^{tn + T} K_f \Delta V dt \geq K, \tag{15}$$

In this case, the value $K_f$ is set at 1.0 or more for a high sensitivity (for quick operation) and at less than 1.0 for a low sensitivity (for slow operations).

Another method uses the following Formula to correct the corrected value $K_f$ with the integration time T.

Formula 16

$$\int_{tn}^{tn + T \cdot K_f} \Delta V dt \geq K, \tag{16}$$

In this case, the controls (the fuzzy inference) are executed such that the value $K_f$ is set at 1.0 or more for a high sensitivity and at less than 1.0 for a low sensitivity.

Another method corrects the insensitive zone set value (the minimum of the deviation $V_3$ to be operated by the present apparatus) with the value $K_f$, as shown in FIG. 5. In this case, the controls are executed for a low sensitivity (for reducing the tap changing frequency), if the value $K_f$ is set at 1.0 or more, and for a high sensitivity (for improving the voltage characteristic) if the value $K_f$ is set less than 1.0. It is quite straightforward for all these control coefficient corrected values $K_f$ to be determined by fuzzy inference.

By the methods thus far described, the correction controls (for high and low sensitivity) can be executed in a similar way to the known method of correcting the integration.

Figure 18:
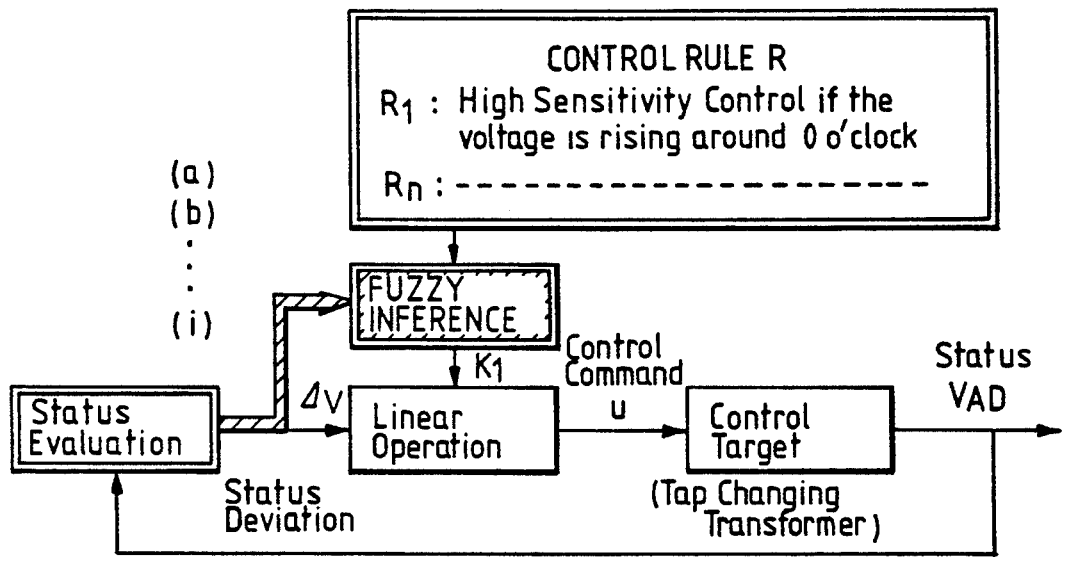
FIG. 18 is a block diagram showing functions of an embodiment of a method according to the present invention.

FIG. 18 is a function block diagram showing the present embodiment thus far described. As compared with the block diagram of the known apparatus shown in FIG. 8, the linear operation and the control object are identical. Although the status evaluation unit notes only the deviation value $\Delta V$ in the known apparatus, the present invention notes the aforementioned (numerous status evaluations) items (a) to (i).

In this embodiment of the present invention, moreover, the control coefficient (integration constant) corrected value $K_f$ is determined by the fuzzy inference unit of FIG. 18 to correct the control parameter of the linear operation of the known apparatus by using the status evaluation items referred to above and the control rule membership function. As a result, the present invention can improve control performance as arranged with the known method.

Next, a second embodiment will be described in which the adaptable (learning) type of fuzzy control is applied by evaluating the control performance of the control result to adjust repeatedly the control coefficient (the integration constant).

Figure 19:
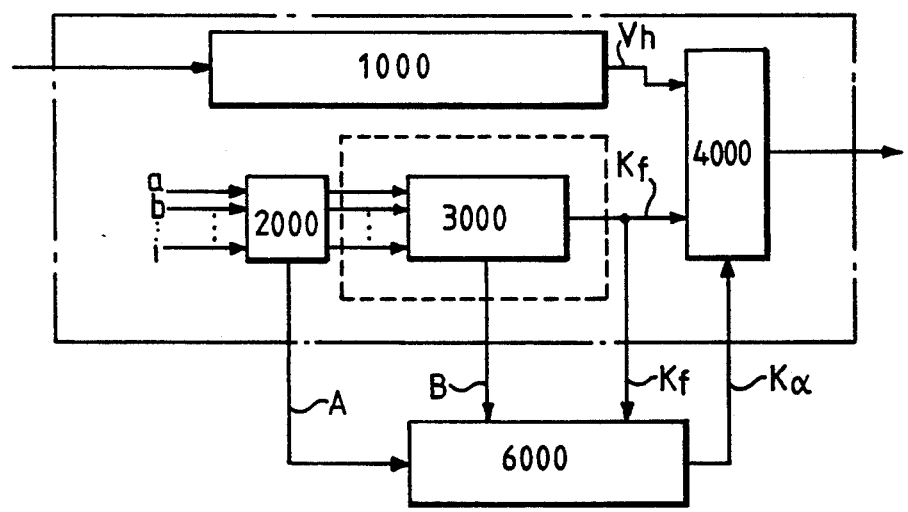
FIG. 19 is a block diagram showing an adaptable (learning) type apparatus according to a further embodiment of the present invention.

FIG. 19 shows an example of the block structure of this second embodiment of the present invention. In FIG. 19, the function blocks 1000, 2000 and 3000 are identical to those of FIG. 1. Thus, the block 1000 is a deviation integrating function ($V_4$), the block 2000 is a status evaluating function, and the block 3000 is an integration constant corrected value inferring function. The block 4000 is a tap changing propriety judging function for executing the following judging process.

$$V_5 \geqq K \cdot K_f K\alpha,$$

wherein:

$V_5$: deviation Integration Value ($V_4$)

$K$: Integration Constant (Integration Time Set Value $\times 10\%$)

$K_f$: Integration Constant Corrected Value $K\alpha$: Adaptation (learning) Integration Constant Corrected Value, (Coefficients to be newly determined in the present embodiments)

The block 6000 in FIG. 19 is the control performance evaluation and adaptation (learning) integration constant corrected value generation control functions, which are added for the present invention.

In this second embodiment, the functions and operations of the function blocks 1000, 2000 and 3000 will not be described in further detail because they have been detailed in connection with the first embodiment (of FIG. 1). Hence, only the function block 6000, being a control performance evaluation and adaptation (or learning) integration constant corrected value generation control function will be described in detail.

Figure 20:
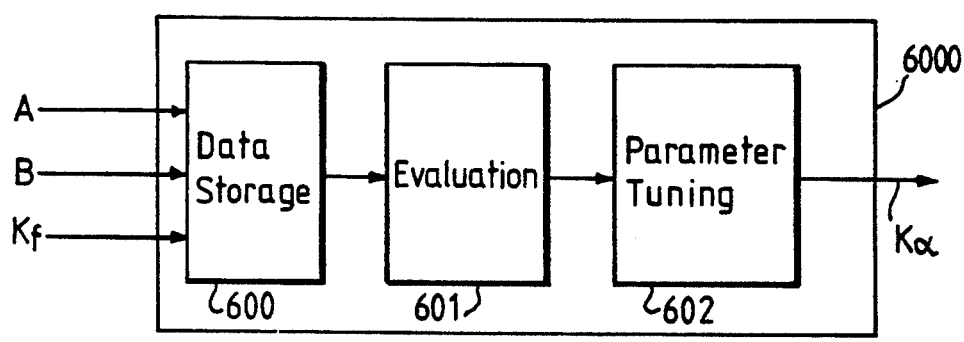
FIG. 20 is a block diagram showing the control performance evaluating function.

FIG. 20 shows an example of the detailed subfunction blocks of the control function block 6000 of FIG. 19. In FIG. 20, there is shown a data storage unit 600, a data evaluation unit 601 (a control performance evaluation unit), and a parameter tuning unit 602 for adjusting/setting the adaptation (learning) integration constant corrected value $K\alpha$ on the basis of the evaluation result.

The adaptation (learning) integration constant corrected value $K\alpha$ is determined by adding the parameter adjusting learning functions, similar to those of the expert, to the present apparatus, as the expert evaluates the control performance and adjusts the parameter. Therefore, the corrected value $K\alpha$ is set and adjusted not by only one feature/factor but by the following factors:

(1) Factor $K\alpha_1$ to be changed (learned) for a time zone;

(2) Factor $K\alpha_2$ to be changed (or learned) for a one-day period (reflecting the control performance of the previous day);

(3) Factor $K\alpha_3$ to be differentiated for seek days and holidays and changed accordingly;

(4) Factor $K\alpha_4$ to be changed for special days (e.g., national holidays or special event days);

(5) Factor $K\alpha_5$ to be changed every week;

(6) Factor $K\alpha_6$ to be changed every month;

(7) Factor $K\alpha_7$ to be changed every season;

(8) Factor $K\alpha_8$ to be changed according to the site at which the present apparatus is installed.

Thus, the corrected value $K\alpha$ can be expressed in the following form so as to reflect all these factors:

Formula 17
$$K\alpha = K\alpha_1 \cdot K\alpha_2 \cdot K\alpha_3 \cdot K\alpha_4 \cdot K\alpha_5 \cdot K\alpha_6 \cdot K\alpha_7 \cdot K\alpha_8. \quad (17)$$

The control performance remains un, changed (while maintaining the present status), if the product of $K\alpha_1$ to $K\alpha_8$ is 1.0, for the low sensitivity (to reduce the frequency of tap change) if not more than 1.0, and for high sensitivity (to improve the voltage characteristic) if not less than 1.0.

In order that these parameters ($K\alpha_1$ to $K\alpha_8$) may be determined and adjusted for each period, it is important to determine what data and how much data are to be stored in the data storage unit 600 and the data evaluation unit 601 and what feature is to be extracted so as to improve the control performance, and to determine how the optimum parameter values are to be determined by tuning the parameters on the basis of the feature.

Therefore, for example the following data may be stored in the data storage unit 600 of FIG. 20.

① Frequency of tap change (e.g., the frequency for the previous day, the frequency for a time zone, or values $V_3$ and $V_4$);

② Hysteresis of the deviation value ($V_3 = V_1 - V_2$), and the time zones and the maximum and minimum values thereof;

③ Time zones and the maximum and minimum values of the 30 min. average voltage error (in %) or 5 min. average voltage error; and ④ Hysteresis of the deviation value $V_4$ and the maximum and minimum and their time zones.

On the basis of this stored data the individual features may be extracted in the evaluation unit 601 of FIG. 20, and the aforementioned product of $K\alpha_1$ to $K\alpha_8$ is determined by multiplying them by their corresponding periods. These values are used until revised on the basis of measurement for a subsequent period. Thus, the coefficients to be adjusted at intervals of one day are adjusted every day, and the coefficients to be adjusted at intervals of one week are adjusted every week.

In order that the output of the tap changing transformer or the target voltage (the reference voltage $V_2$) may have a low switching frequency, in the second embodiment the voltage characteristic is improved while reducing the frequency of the tap change by determining the coefficients to be adjusted for each time zone (8 to 10 o'clock or 12 to 13 o'clock), every day (e.g., the coefficient adjusted while reflecting on the control performance of yesterday), every week (the optimum parameter obtained by tuning a one-week parameter) and the season.

The values A, B and $K_f$ inputted to the data storage unit of FIG. 20 are identical to the values A, B and $K_f$ in FIG. 19. Thus, the value A is the status evaluation result of the block 2000 of FIG. 19 and is the data corresponding to (a) to (i) above. Moreover, the value B is an intermediate value of the integration constant corrected value inference (the fuzzy inference) from the block 3000 of FIG. 19 and may be, for example, the value of the adaptability for the membership function shown in FIG. 17. The value $K_f$ is the integration constant value.

Figure 21:
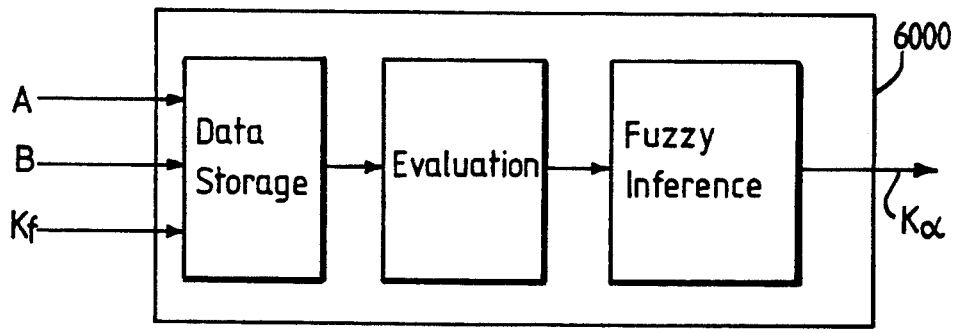
FIG. 21 is another block diagram showing a modification of the control performance evaluating function.

FIG. 21 shows an arrangement in which the parameter tuning unit 602 of FIG. 20 is modified by use of a method fuzzy inference that is identical to that of the integration constant corrected value inferring function 3000. Thus, the value $K_f$ is determined every 0.1 secs, and the value $K\alpha$ is a constant to be changed for a time zone, once a day, or once a week. The coefficient for a long period is optimized by determining the tendency of change of that coefficient.

In this present embodiment, the control performance (the tap changing frequency or the voltage characteristic) of the control result is evaluated to adjust the integration constant repeatedly. In other words, this embodiment has a sensitivity adjusting system based on repeated learning.

The values A, B and $K_f$ to be inputted to the data storage unit, the evaluation unit and the data storage unit of FIG. 21 are identical to those of FIG. 20.

In other words, the embodiment of FIG. 21 determines the adaptability (learning) integration constant corrected value Ks by fuzzy inference.

Next, a further embodiment will be described, in which the membership function of the fuzzy inference unit for determining repeatedly the integration constant corrected value from the fuzzy inference by evaluating the control performance of the control result and the adaptation (learning) fuzzy control for changing the rules are applied.

Figure 22:
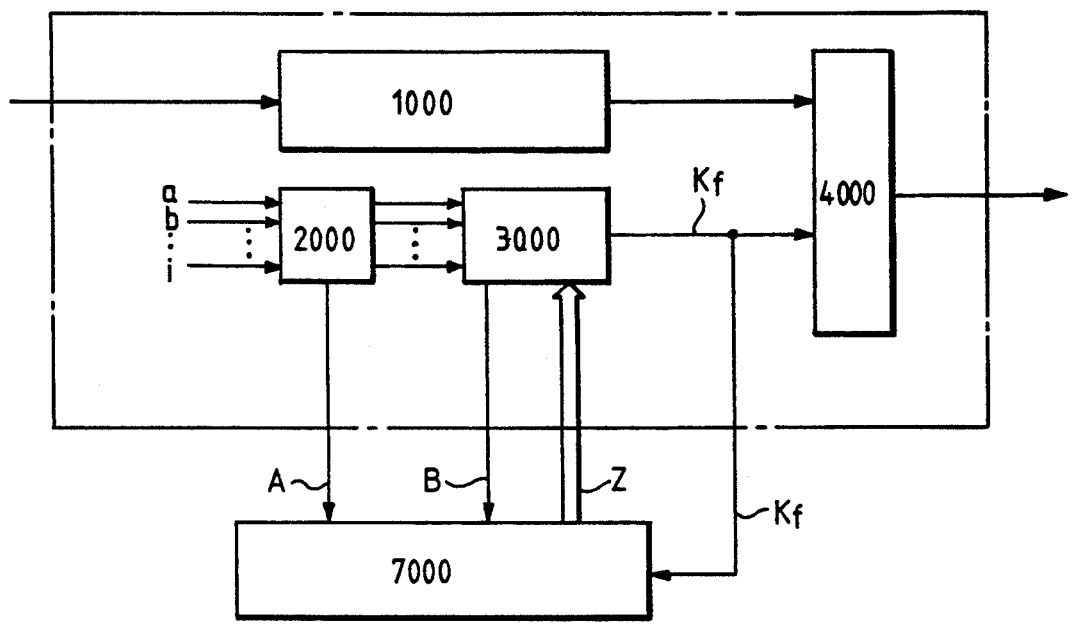
FIG. 22 is a block diagram showing a further adaptable (learning) type apparatus.

FIG. 22 shows a block diagram of this embodiment. In FIG. 22, the function blocks 1000, 2000, 3000 and 4000 are identical to those of FIG. 1.

The function block 7000 is similar to block 6000 of FIGS. 20 and 21 but has a different final output. Although the final output of block 6000 of FIGS. 20 and 21 is an adaptable type integration constant corrected value $K\alpha$, the present embodiment has similar data storage and evaluation but changes the membership function and rules in the integration constant correction inferring function 3000 (identical to the function 3000 of FIG. 1) on the basis of the evaluation result (as indicated at Z in FIG. 22). In other words, the rules shown in FIGS. 10 and 11 and the membership function shown in FIGS. 12 to 14 are changed individually.

This changing timing occurs, like the embodiment of FIG. 19, for a time zone (e.g 6 to 8 o'clock or 12 to 13 o'clock), every day, every week or every season to determine the integration constant corrected value $K_f$. As a result, the judging function block of FIG. 22 computes the formula of $V_5 \geq K \cdot K_f$ in a similar way to the embodiment of FIG. 1.

Thus, the embodiment of FIG. 22 changes the parameters for a time zone, every day, every week, for a unique day, holidays and week days, and every season while determining the integration constant corrected value $K_f$ by fuzzy inference.

The change in the membership function includes range, gradient, shape or level divisions (e.g., the "low", "medium" and "high" (three divisions) to the "small", "slightly small", "medium", "slightly large" and "large" (five divisions).

Although the above embodiments correct the integration constant by fuzzy inference, the present invention permits the tap changing command to be determined directly by fuzzy inference, and an embodiment corresponding to this will now be described.

Figure 23:
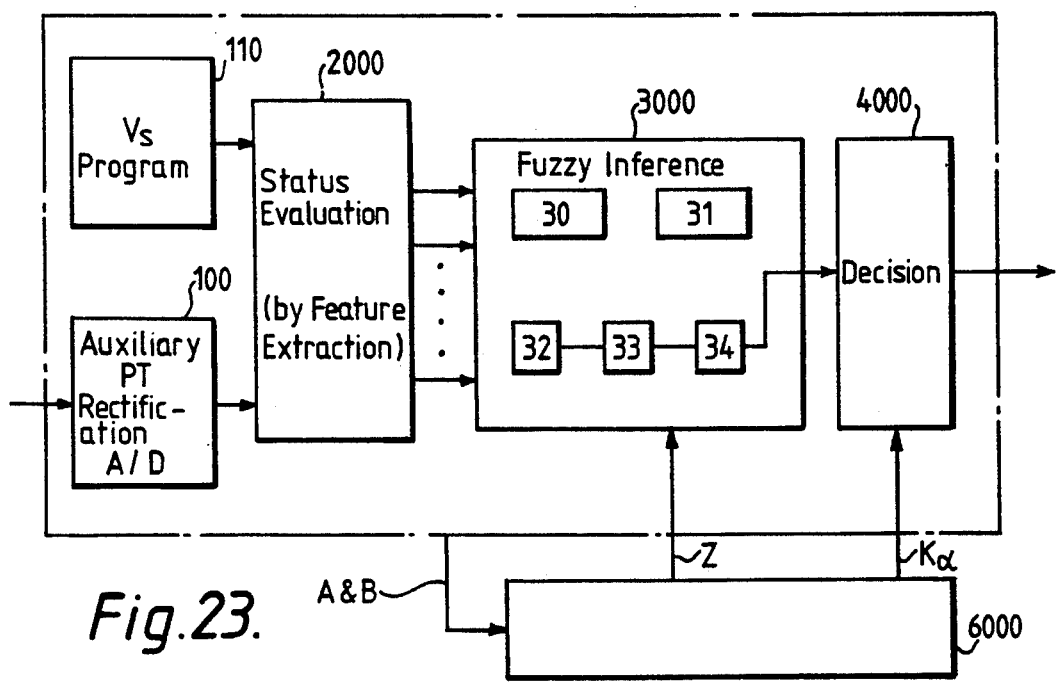
FIG. 23 is a block diagram showing a fuzzy inference direct drive type apparatus.

FIG. 23 shows the block structure of such an embodiment. In FIG. 23, the blocks 100 and 110 are identical to those of FIG. 1. Moreover, the blocks 2000, 3000, 4000 and 6000 are substantially identical to those of FIG. 19. Therefore, only the differences will be described in detail.

In embodiment FIG. 23 in the function block 2000 and the function block 4000 are slightly different from those of FIGS. 1 and 19 because the tap changing command is determined directly by fuzzy inference.

The deviation integration value ($V_4$) is introduced in the function block 2000 as one of the status evaluation items so as to determine the operation time characteristics of the apparatus as shown in FIG. 5. The rest of the structure is identical.

On the other hand, the tap changing propriety judging function 4000 executes the formula of $V_5 \geq K \cdot K_f$ or $V_5 \geq K_f \cdot K\alpha$ in the previous embodiments, but in the embodiment of FIG. 23 the formula of the fuzzy inference output ($F_0$) > the judging constant ($H_0$) is executed. Here, the judging constant $H_0$ corresponds to the integration constant K (=the integration time set value $\times 10\%$) of the previous embodiments and a conversion value for the fuzzy interence output ($F_0$).

Moreover, the function block 6000 of FIG. 23 is identical to those of FIGS. 20 and 21. Therefore, two embodiments can be conceived when the function block 6000 is applied. One is the embodiment of FIG. 19 making use of an integration constant correcting method. The function block 4000 in this case has the following operations.

$$F_O > H_0 \cdot K\alpha$$

Another possibility is the embodiment of FIG. 22 for executing the fuzzy inference by changing the membership function or rules of the fuzzy inference unit 3000. The result ($F_0'$) is outputted to execute the $F_0' > H_0$ in the function block 4000.

The embodiments thus far described execute the following operations with the result of the studies of the function block 6000 of FIGS. 19, 22 and 23:

① Corrections (changes) of the control coefficients (the integration constant, the integration time or the insensitive zone);
② Changes in the membership relationship; and
③ Changes in the rules.

As may easily be determined, however, the most coincident (adaptable) pattern (type) may be selected and controlled according to the learning result from the several patterns (types) (the rule groups or membership function groups) prepared in advance as a result of the learning with the function block 6000.

Hence, the study of the function block 6000 is used for the selected data of the several patterns (or types) prepared in advance.

For example, the rules corresponding to urban situations and rural situations and the membership function are prepared in advance, and which type is to be used is determined by a learning operation. If necessary, they may be used alternately.

Moreover, the following rules and membership function groups may be prepared, and the type to be used may be determined according to the learning result, as may easily be deduced:

① Tap changing frequency reducing type;
② Voltage characteristic improvement type; and
③ Tap changing frequency type reducing and voltage characteristic improvement types.

Although the execution timing of all the fuzzy inference units of the above embodiments has not been described in detail, it may readily be accomplished for any sample data in conformity with the processing ability of the microcomputer (computer) or only if a certain condition occurs.

According to the present invention, even when the voltage pattern fluctuates with the fluctuations of the load, it is possible not only to hold the target voltage (to improve the voltage characteristic), but also significantly to reduce the frequency of tap change. This makes it possible to prolong the lifetime and enhance the reliability of the tap changing transformer.

Since the apparatus develops by itself as the running achievements accumulates, it can carry out optimum control at all times even for a target voltage (voltage pattern) which is different for the particular site of installation, so that a constant voltage can be stably supplied to any consumer. In short, the voltage characteristic can be improved.

In the above detailed description of the embodiments of the present invention, control of voltage has been considered. However, it is also possible to apply the present invention to control of reactive power, since reactive power and voltage are related in any given system.

Figure 24:
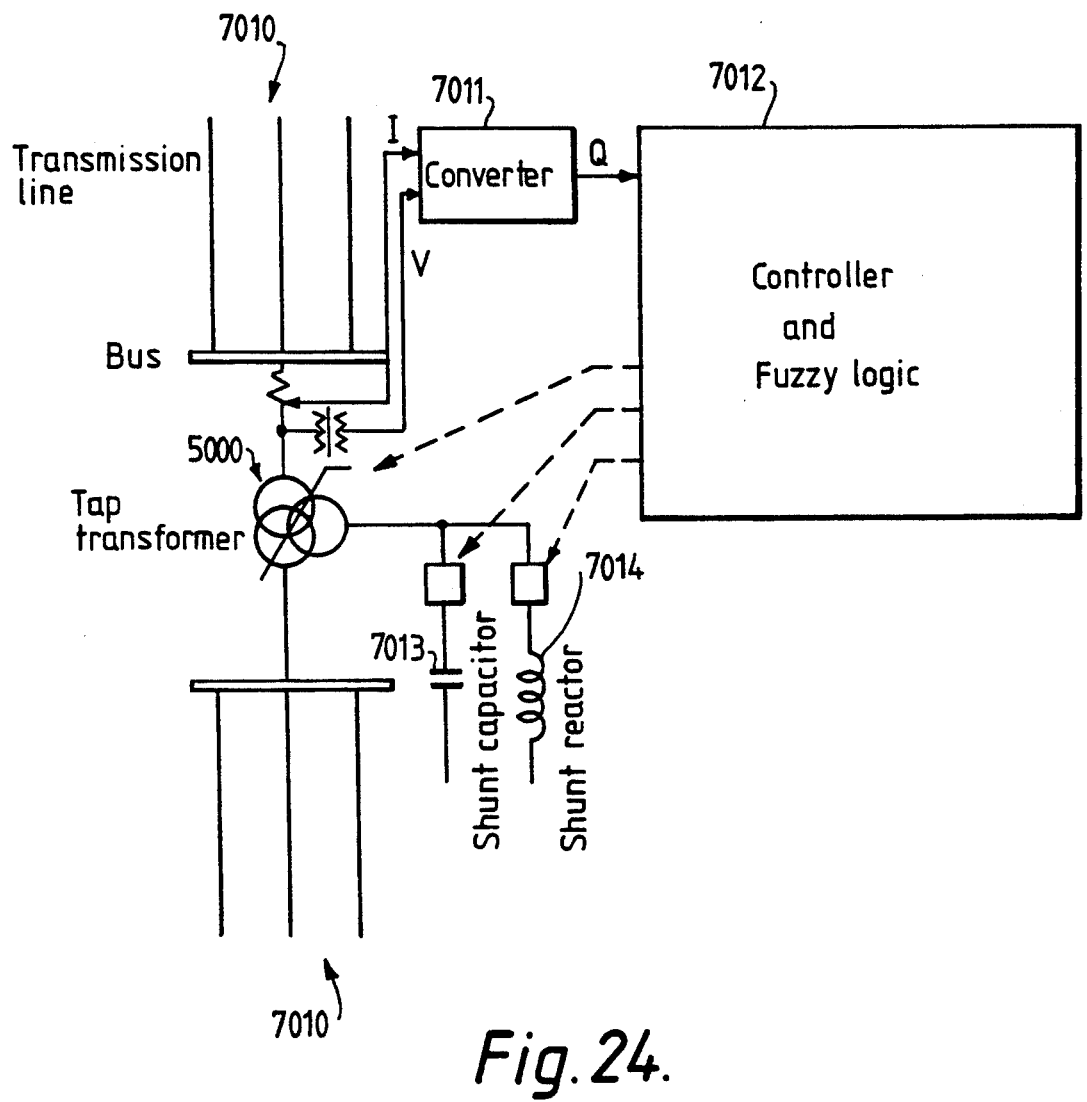
FIG. 24 is a block diagram of a further embodiment, in which the present invention is applied to the control of reactive power.

An embodiment illustrating control of reactive power is shown in FIG. 24. The fuzzy logic control in this embodiment is substantially the same as in the embodiment of FIG. 1 to 18, and detailed description is therefore omitted. In the embodiment of FIG. 24, a tap transformer 5000 is connected in a transmission line 7010. A converter 7011 generates a reactive power measurement Q, which reactive power measurement Q is derived from the system voltage V and current I. The reactive power measurement Q is fed to a controller and fuzzy logic unit 7012 which, as stated earlier, is virtually the same as in previous embodiments. On the basis of measurement of the reactive power Q by the controller and fuzzy logic unit 7012, a shunt capacitor 7013 and/or shunt reactor 7014 are connected to the tap transformer 5000 to control the switching thereof. That switching is controlled in order to ensure that the reactive power meets conditions corresponding to those discussed for the previous embodiments.

Of course, modifications incorporated in some or all of the embodiments described previously may also be incorporated into this embodiment.

What is claimed is:

1. A method of controlling a voltage, said method comprising:
   detecting the voltage difference between said voltage and a reference voltage;
   establishing a plurality of control conditions;
   determining a new voltage difference such that:

$$\int^A C\Delta V dT \geq B,$$

where: t is time,
   V is said new voltage difference, and
   A, B and C are parameters, and
   wherein at least one of said parameters A, B and C is varied based on an analysis of said control conditions, said analysis being performed by fuzzy logic which converts the control conditions into qualitative items, utilizing a membership function, and combines the qualitative items, utilizing an inferential rule, to induce a quantitative item; and
   controlling said voltage on the basis of said quantitative item.

2. A method according to claim 1 further comprising varying said reference voltage with time.

3. A method according to claim 1, wherein said control conditions include the absolute time.

4. A method according to claim 1, wherein said control conditions include the trend of variation of said voltage with time.

5. A method according to claim 1, wherein said control conditions include the value of $\Delta V$ at any time.

6. A method according to claim 1, wherein said control conditions include $\int^X \Delta V dt$, and $\int^Y \Delta V dt$ where X is different from Y.

7. A method according to claim 1, further comprising evaluating the control of the voltage with time, and varying said control conditions based on said evaluating of said control.

8. A method of controlling a voltage, using a tap transformer which varies voltage by change in the tap position, said method comprising:
   detecting the voltage difference between said voltage and a reference voltage; and
   controlling said tap transformer by fuzzy logic on the basis of control conditions, including said voltage difference and a predetermined desired number of tap position changes, wherein the fuzzy logic converts the control conditions into qualitative items, utilizing a membership function, and combines the qualitative items, utilizing an inferential rule, to induce a quantitative item.

9. A method according to claim 8, further comprising evaluating the control of the voltage with time, and varying said control conditions based on said evaluating of said control.

10. A method of controlling a voltage, using a tap transformer which varies voltage by change in tap position, said method comprising:
    detecting the voltage difference between said voltage and a reference voltage; and
    controlling said tap transformer by fuzzy logic on the basis of control conditions including the integral over time of said voltage difference and a predetermined desired number of tap position changes, said fuzzy logic converting the control conditions into qualitative items, utilizing a membership function, and combining the qualitative, items utilizing an inferential rule, to induce a quantitative item.

11. A method of controlling a voltage, said method comprising:
    detecting the voltage difference between said voltage and a reference voltage;
    generating a control signal having a predetermined relationship to said voltage difference;
    establishing a plurality of control conditions;
    analyzing said control conditions using fuzzy logic which converts the control conditions into qualitative items, utilizing a membership function, and combines the qualitative items, utilizing an inferential rule, to induce a quantitative item;
    generating a control coefficient based on said analyzing of said control condition; and
    controlling said voltage on the basis of said control coefficient and said control signal.

12. A method according to claim 11 wherein said control signal is such that:

$$\int \Delta V dt \geq D,$$

where:
    t is time,
    $\Delta V$ is said voltage difference, and
    D is a constant parameter 13. A method of controlling a voltage control system to regulate a voltage of the voltage control system, said method comprising:
    detecting the voltage difference between said voltage and a reference voltage;
    establishing a plurality of control conditions;
    determining a new voltage difference such that:

$$\int^A C\Delta V dt \geq V,$$

where:

t is time,

ΔV is said new voltage difference, and

A, B and C are parameters, and wherein at least one of said parameters A, B and C is varied based on an analysis of said control conditions, said analysis being performed by fuzzy logic which converts the control conditions into qualitative items, utilizing a membership function, and combines the qualitative items, utilizing an inferential rule, to induce a quantitative item; and controlling said voltage on the basis of said control signal.

14. A method of controlling a voltage control system to regulate a voltage of the voltage control system, said method comprising:

detecting the voltage difference between said voltage and a reference voltage;

generating a control signal having a predetermined relationship to said voltage difference;

establishing a plurality of control conditions;

analyzing said control conditions using fuzzy logic which converts the control conditions into qualitative items, utilizing a membership function, and combines the qualitative item, utilizing an inferential rule, to induce a quantitative item;

generating a control coefficient based on said analyzing of said control conditions; and controlling said voltage on the basis of said control coefficient and said control signal.

15. A voltage control device comprising:

means for detecting a voltage to be controlled;

means for storing a reference voltage;

means for determining the voltage difference between said detected voltage and said reference voltage;

fuzzy logic means for:
  i) establishing a plurality of control conditions,
  ii) analyzing said control conditions, and
  iii) generating an output for controlling said voltage such that:

$$\int^A C\Delta V dt \geq B,$$

where:

t is time,

ΔV is said voltage difference, and

A, B and C are parameters, said fuzzy logic means being arranged to vary at least one of said parameters A, B and C based on said analyzing of said control conditions logic; and means for controlling said voltage in accordance with said output.

16. A voltage control device according to claim 15, further comprising:

means for monitoring the variation of said output with time; and means for varying said control conditions in dependence on said variation of said output.

17. A voltage control device comprising:

means for detecting a voltage to be controlled;

means for storing a reference voltage;

means for determining the difference between said detected voltage and said reference voltage;

fuzzy logic means for establishing a plurality of control conditions, converting the control conditions into qualitative items, utilizing a membership function, combining the qualitative items, utilizing an inferential rule, to induce a quantitative item, and generating a control coefficient based on the quantitative item; and means for controlling said voltage on the basis of said control signal and said control coefficient.

18. A voltage control system comprising:

means for detecting a voltge to be controlled;

means for storing a reference voltage;

means for determining the voltage difference between said detected voltage and said reference votage;

fuzzy logic means for:
  i) establishing a plurality of control conditions,
  ii) establishing a plurality of control condition,
  iii) generating an output for controlling said voltage such that:

$$\int^A C\Delta V dt \geq B,$$

where:

t is time,

ΔV is said voltage difference, and

A, B and C are parameters, said fuzzy logic means being arranged to vary at least one of said parameters A, B and C in dependence on said analyzing of said control conditions; and a voltage regulating device for regulating said voltage on the basis of said output.

19. A voltage control system according to claim 18, wherein said voltage regulating device is a tap transformer.

20. A voltage control system according to claim 18, further comprising:

means for monitoring the variation of said voltage with time; and means for varying said control conditions on the basis of said variation of said voltage.

21. A voltage control system comprising:

means for detecting a voltage to be controlled;

means for storing a reference voltage;

means for determining the difference between said detected voltage and said reference voltage;

means for generating a control signal having a predetermined relationship to said voltage difference;

fuzzy logic means for establishing a plurality of control conditions, converting the control conditions into qualitative items, utilizing a membership function, combining the qualitative items, utilizing an inferential rule, to induce a quantitative item, and generating a control coefficient based on the quantitative items; and a voltage regulating device for controlling said voltage on the basis of said control signal and said control coefficient.

22. A voltage control system comprising:

a tap transformer having at least one tap for controlling a voltage by change in the position of said tap;

means for detecting said voltage;

means for storing a reference voltage;

means for determining the voltage difference between said detected voltage and said reference voltage;

fuzzy logic means for controlling said transformer on the basis of control conditions, including said voltage difference and a predetermined desired number of changes in said tap position, said fuzzy logic converting the control conditions into qualitative items, utilizing a membership function, and combining the qualitative items, utilizing an inferential rule, to induce a quantitative item.

23. A voltage control system comprising:
a tap transformer having at least one tap for controlling a voltage by change in the position of said tap; and a voltage control device for controlling said tap transformer on the basis of the integral over time of said voltage difference and a predetermined desired number of changes in said tap position.

24. A method of controlling reactive power, comprising:
detecting the reactive power difference between said reactive power and a reference reactive power;
reestablishing a plurality of control conditions; and
determining a new reactive power difference such that:

$$\int^A C \Delta Q dt \geq B,$$

where:
t is time,
$\Delta Q$ is said reactive power difference, and
A, B and C are parameters, and
wherein at least one of said parameters A, B and C is varied based on an analysis of said control conditions, said analysis being performed by fuzzy logic which converts the control conditions into qualitative items, utilizing a membership function, and combines the qualitative items utilizing an inferential rule, to induce a quantitative item; and
controlling said reactive power on the basis of said quantitative item.

25. A method of controlling reactive power, comprising:
detecting the reactive power difference between said reactive power and a reference reactive power;
generating a control signal having a predetermined relationship to said reactive power difference;
establishing a plurality of control conditions;
analyzing said control conditions using fuzzy logic which converts the control conditions into qualitative items, utilizing a membership function, and combines the qualitative items utilizing an inferential rule, to induce a quantitative item;
generating a control coefficient based on said analyzing of said control conditions; and
controlling said reactive power on the basis of said control coefficient and said control signal.

26. A method of controlling a reactive power control system to regulate a reactive power of the reactive power control system, said method system comprising:
detecting the reactive power difference between said reactive power and a reference reactive power;
establishing a plurality of control conditions;
determining a new reactive power difference such that:

$$\int^A C \Delta Q dt \geq B,$$

where:
t is time,
$\Delta Q$ is said new reactive power difference, and
A, B and C are parameters, and
wherein at least one of said parameters A, B and C is varied based on an analysis of said control conditions, said analysis being performed by fuzzy logic which converts the control conditions into qualitative items, utilizing a membership function, and combines the qualitative items, utilizing an inferential rule, to induce a quantitative items; and
controlling said reactive power in accordance with the new reactive power difference.

27. A method of controlling a reactive power control system to regulate a reactive power of the reactive power control system, said method comprising:
detecting the reactive power difference between said reactive power and a reference reactive power;
generating a control signal having a predetermined relationship to said reactive power difference;
establishing a plurality of control conditions;
analyzing said control conditions using fuzzy logic which converts the control conditions into qualitative items, utilizing a membership function, and combines the qualitative items, utilizing an inferential rule, to induce a quantitative item;
generating a control coefficient based on said analyzing of said control conditions; and
controlling said reactive power on the basis of said control coefficient and said control signal.

28. A reactive power control device comprising:
means for detecting a reactive power to be controlled;
means for storing a reference reactive power;
means for determining the reactive power difference between said detected reactive power and said reference reactive power;
fuzzy logic means for:
i) establishing a plurality of control conditions,
ii) analyzing said control conditions, and
iii) generating an output for controlling said reactive power such that:

$$\int^A C \Delta Q dt \geq B,$$

where:
t is time,
$\Delta Q$ is said reactive power difference, and
A, B and C are parameters, said fuzzy logic means being arranged to vary at least one of said parameters A, B and C in dependence on said analyzing of said control conditions; and
means for controlling said reactive power in accordance with said output.

29. A reactive power control device comprising:
means for detecting a reactive power to be controlled;
means for storing a reference reactive power;
means for determining the difference between said detected reactive power and said reference reactive power;
means for generating a control signal having a predetermined relationship to said reactive power difference;
fuzzy logic means for establishing a plurality of control conditions, converting the control conditions into qualitative items, utilizing a membership function, combining the qualitative items, utilizing an inferential rule, to induce a quantitative item, and generating a control coefficient into on the quantitative item; and
means for controlling said reactive power on the basis of said control signal and said control coefficient.

30. A reactive power control system comprising:
means for detecting a reactive power to be controlled;
means for storing a reference reactive power;

means for determining the reactive power difference between said detected reactive power and said reference reactive power;

fuzzy logic means for:
i) establishing a plurality of control conditions,
ii) analyzing said control condition, and
iii) generating an output for controlling said reactive power such that:

$$\int^A C\Delta Q dt \geq B,$$

where:
t is time,
$\Delta Q$ is said reactive power difference, and
A, B and C are parameters, said fuzzy logic means being arranged to vary at least one of said parameters A, B and C in dependence on said analyzing of said control conditions; and a reactive power regulating device for regulating said reactive power on the basis of said output.

31. A reactive power control system comprising:
means for detecting a reactive power to be controlled;
means for storing a reference reactive power;
means for determining the difference between said detected reactive power and said reference voltage;
means for generating a control signal having a predetermined relationship to said reactive power difference;
fuzzy logic means for establishing a plurality of control conditions, converting the control conditions into qualitative items, utilizing a membership function, combining the qualitative items, utilizing an inferential rule, to induce a quantitative item, and generating a control coefficient based on the quantitative item; and
a reactive power regulating device for controlling said reactive power on the basis of said control signal and said control coefficient.

32. Apparatus for controlling a voltage, comprising:
means for detecting the voltage difference between said voltage and a reference voltage;
means for establishing a plurality of control conditions;
means for determining a new voltage difference such that:

$$\int^A C\Delta V dt \geq B,$$

where:
t is time,
$\Delta V$ is said new voltage difference, and
A, B and C are parameters;
fuzzy logic means for analyzing said control conditions, converting the control conditions into qualitative items, utilizing a membership function, and combining the qualitative items, utilizing an inferential rule, to induce a quantitative item;
fuzzy logic means for analyzing said control conditions, converting the control conditions into qualitative items, utilizing a membership function, and combining the qualitative items, utilizing an inferential rule, to induce a quantitative item;
means for varying at least one of said parameters A, B and C based on said analyzing of said control conditions; and
means for controlling said voltage on the basis of said quantitative item.

33. Apparatus according to claim 32, further comprising means for varying said reference voltage with time.

34. Apparatus according to claim 32, wherein said control conditions include the absolute time.

35. Apparatus according to claim 32, wherein said control conditions include the trend of variation of said voltage with time.

36. Apparatus according to claim 32, wherein said control conditions include the value of V at any time.

37. Apparatus according to claim 32, wherein said control conditions include $\int^X \Delta V dt$ and $\int^Y \Delta V dt$ where X is different from Y.

38. Apparatus according to claim 32, further comprising means for evaluating the control of the voltage with time; and means for varying said control conditions based on said evaluating of said control.

39. Apparatus for controlling a voltage, comprising:
means for detecting the voltage difference between said voltage and a reference voltage;
means for generating a control signal having a predetermined relationship to said voltage difference;
means for establishing a plurality of control conditions;
means for analyzing said control conditions using fuzzy logic which converts the control condition into qualitative items, utilizing a membership function, and combines the qualitative items, utilizing an inferential rule, to induce a quantitative item;
means for generating a control coefficient based on said analyzing of said control condition; and
means for controlling said voltage on the basis of said control coefficient and said control signal.

40. Apparatus according to claim 39, wherein said control signal is such that:

$$\int \Delta V dt \geq D,$$

where:
t is time,
$\Delta V$ is said voltge difference, and
D is a constant parameter.

41. Apparatus for controlling a voltage control system to regulate a voltage of the voltage control system, said apparatus comprising:
means for detecting the voltage difference between said voltage and a reference voltage;
means for establishing a plurality of control conditions;
means for determining a new voltage difference such that:

$$\int^A C\Delta V dt \geq B,$$

where:
t is time,
$\Delta V$ is said new voltage difference, and
A, B and C are parameters;
means for varying at least one of said parameters A, B and C based on an analysis of said control conditions, said analysis being by fuzzy logic which converts the control conditions into qualitative items, utilizing a membership function, and combines the qualitative items, utilizing an inferential rule, to induce a quantitative item; and
means for controlling said voltage in accordance with the new voltage difference.

42. Apparatus for controlling a voltage control system to regulate a voltage of the voltage control system, said apparatus comprising:

means for detecting the voltage difference between said voltage and a reference voltage;

means for generating a control signal having a predetermined relationship to said voltage difference;

means for establishing a plurality of control conditions;

means for analyzing said control conditions using fuzzy logic which converts the control conditions into qualitative items, utilizing a membership function, and combines the qualitative items utilizing an inferential rule, to induce a quantitative item;

means for generating a control coefficient based on said analyzing of said control conditions; and means for controlling said voltage on the basis of said control coefficient and said control signal.

* * * * *